Aug. 20, 1968   J. C. HATCHER   3,397,933
MOUNTING FOR SOIL TILLING DISC
Filed Jan. 28, 1966
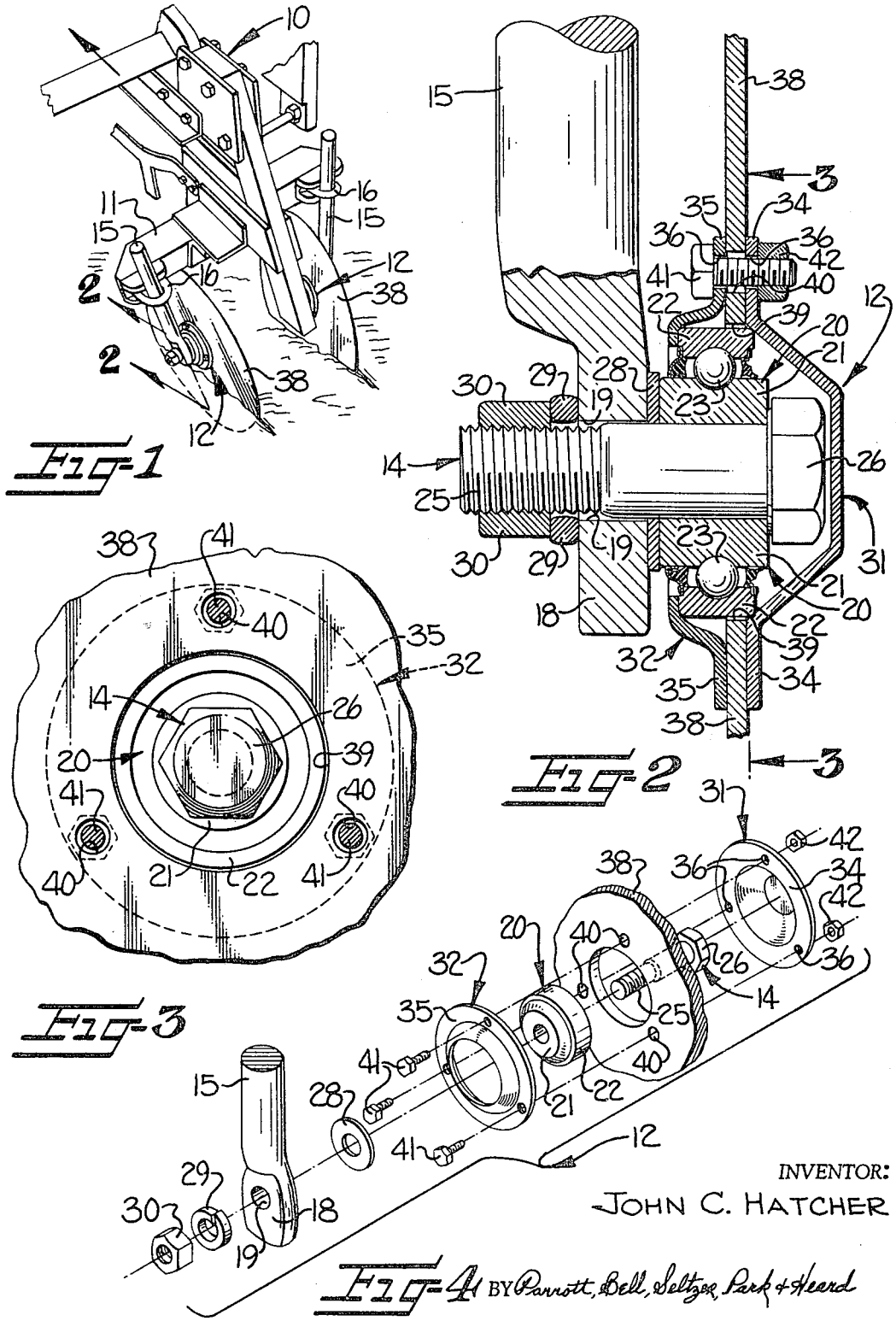
INVENTOR:
JOHN C. HATCHER
BY Parrott, Bell, Seltzer, Park & Heard
ATTORNEYS United States Patent Office 3,397,933
Patented Aug. 20, 1968

3,397,933
MOUNTING FOR SOIL TILLING DISC
John C. Hatcher, Charlotte, N.C., assignor to Cole Manufacturing Company, Charlotte, N.C., a corporation of North Carolina
Filed Jan. 28, 1966, Ser. No. 523,665
4 Claims. (Cl. 308—181)

My invention relates to an agricultural soil tilling implement mounting and, more particularly, to a mounting for a soil tilling disc means in which failure of the mounting assembly, due to abnormal impact loads occurring during soil tilling operations and imposed radially on the disc means, is avoided.

Disc means of various sorts are widely used in agricultural soil tilling machines to perform a variety of operations, such as opening the earth for seeding, forming hills or rows, side placing fertilizers, and harrowing. In any such operation where a soil tilling disc means engages the earth during tilling operations, the disc means must be rotatably supported against a normal reaction force and against abnormal impact load forces resulting from the disc means striking an obstruction in the soil such as a rock or stump, which forces are directed radially inwardly on the disc means. Accommodation of the normally existing radially inwardly directed force is relatively easily accomplished, inasmuch as this force is not excessively large during most soil tilling operations.

In disc means implement mountings heretofore in wide use, a disc means has been rotatably supported by providing a hub, to which the disc means is secured by suitable fastening means such as bolts or rivets. A bearing means, such as a ball or roller bearing, is mounted in the hub and rotatably supports the hub and disc means from a non-rotatably supported shaft. The normally existing radially inwardly directed force applied to the disc means is transmitted from the disc means to the hub through the fastener means, and from the hub to the outer race of the bearing means. As the fastener means are disposed generally perpendicular to the direction of load and parallel to the axis of rotation, the transmission of force therethrough results in shear stress in the fastener means.

A frequent cause of failure of an agricultural soil tilling implement mounting of the type described is the imposition of abnormally large radial loads on the disc means, resulting from impact of the disc means with objects in the earth such as rocks and tree stumps. Upon such impact, and the imposition of an abnormal radial load on the disc means, elements of the mounting assembly which support the disc means for rotation, and particularly the fastener means, are subjected to excessive shear force, which frequently causes failure of those elements and thus destroys the usefulness of the mounting assembly and soil tilling implement.

It is an object of this invention to provide an agricultural soil tilling implement mounting for a soil tilling disc means in which impact loads imposed upon the disc means during soil tilling operations, as by striking objects in or on the earth being tilled, are safely accommodated. This object is realized by providing a mounting of the type described in which the relative radial clearances of the disc means from the supporting elements is such that impact loads applied radially to the disc means are transmitted directly to an outer race of a bearing means which supports the disc means for rotation, with other elements of the mounting assembly remaining free from shear stress.

A further, and more specific, object of this invention is to provide a mounting for a soil tilling disc means in which the disc means is supported for rotation by an outer race of a bearing means and by bearing flange means. In accordance with my invention, the disc means is spaced from the outer race at a first predetermined radial clearance distance, and fastener means penetrating and securing together the disc means and the flange means are spaced from the disc means a predetermined second radial clearance distance greater than the first radial clearance distance, so that the fastener means are protected against the imposition of shear stress upon an abnormal load being applied to the disc means.

Some of the objects and advantages of my invention having been stated, others will appear as the description proceeds, when taken in connection with the accompanying drawings, in which:

FIGURE 1 is a perspective view of a soil tilling machine incorporating an implement mounting in accordance with my invention;

FIGURE 2 is an elevation view, in partial section, of the soil tilling implement mounting of my invention, taken generally as indicated by the line 2—2 in FIGURE 1;

FIGURE 3 is a side elevation view, in partial section, taken generally as indicated by the arrows 3, 3 in FIGURE 2; and FIGURE 4 is an exploded perspective view of the elements of the implement mounting of FIGURES 2 and 3.

Referring now more particularly to the drawing, the agricultural soil tilling implement mounting of my invention is generally shown in FIGURE 1 as used with an agricultural machine, generally indicated at 10. As the mounting of my invention is susceptible to the wide variety of uses, with a wide variety of agricultural machines, the machine 10 of FIGURE 1 is included for purposes of illustration only and not by way of limitation. The machine 10 may be a planter, such as a corn planter, in which a disc means is employed as a hiller or as a side placer for fertilizer, as generally well known in the construction of planters. Agricultural machines with which the mounting of my invention may be used, such as the machine 10, must have some structure, such as a frame cross-arm 11, from which the mounting may be supported, but it is considered that a variety of manners of connecting the mounting of my invention to a frame will become apparent to one obtaining an understanding of my invention as described below.

The agricultural soil tilling implement mounting of my invention may best be described with reference to the detailed illustrations in FIGURES 2–4, where the various elements of the mounting, generally indicated at 12, are shown.

The implement mounting of my invention comprises a shaft, preferably provided by a bolt 14, which defines an axis of rotation and which is non-rotatably mounted or supported on the agricultural machine 10. One suitable manner for non-rotatably supporting the shaft or bolt 14 is by means of a standard 15, which may be secured to the frame cross-arm 11 by suitable means such as a clamp 16. Where a standard 15 is used, a lower extremity of the standard preferably is forged to provide a portion 18 of generally rectangular cross-section, and a bore 19 is provided therethrough to receive the bolt 14. While the drawing 10 includes a showing of a standard 15 clamped to a frame cross-arm 11 of the agricultural machine 10, it is within the scope of my invention to form the standard 15 integrally with the frame of the agricultural machine to which the mounting assembly is to be attached, or otherwise provide suitable means, such as the bore 19, for receiving the bolt 14 in or on the frame of an agricultural machine.

A bearing means 20 is mounted on the bolt 14, and preferably is an anti-friction type such as a ball bearing having an inner race 21, an outer race 22, and ball members 23 interposed between the races. As is conventional in ball bearing constructions, the races are provided with annular arcuate trackways within which the balls 23 travel. In assembling the bearing means 20 and the bolt 14 (FIGURE 4), the threaded end 25 of the bolt 14 is passed through the inner race 21, to mount the bearing means 20 thereon, and the head end 26 of the bolt 14 is drawn into contact with one side surface of the inner race 21. The bolt 14 is subsequently inserted through a spacer washer 28, if desired as described more fully hereinafter, the bore 19 in the standard 15, a lock washer 29, and a nut 30 is threaded onto the threaded end 25 of the bolt 14. In tightening the nut 30 onto the bolt 14, the inner race 21 is non-rotatably secured in the mounting assembly, and the outer race 22 is freely rotatable about the axis of rotation defined by the bolt 14.

The implement mounting of my invention further includes bearing flange means, preferably in the form of inner and outer bearing flange members 31, 32, respectively. The bearing flange members may be stamped from suitable sheet steel, to have a generally cup-like shape for engaging the outer race 22 of the bearing means 20. The inner bearing flange member 32 has a central opening therein, to permit the bolt 14 to be inserted therethrough during assembly of the mounting (FIGURE 4), while the outer bearing flange member 31 is more deeply cupped to extend entirely over the headed end 26 of the bolt 14. Each of the bearing flange members 31, 32 has a radially outwardly extending portion 34, 35, respectively, which extends beyond the outer race 22 of the bearing means 20, for purposes to be described more fully hereinafter. As the bearing flange members 31, 32 are initially formed, the radially outwardly extending portions 34, 35, respectively, preferably have a slightly conical configuration, and these portions have a plurality of fastener receiving openings 36 therein, positioned to be radially outwardly of the outer race 22 and circumferentially spaced thereabout.

A soil tilling disc means 38 is supported by the outer race 22 of the bearing means 20 and by the flange members 31, 32 for rotation therewith during tilling operations, when the disc means 38 engages the soil (as shown in FIGURE 1). In order to permit mounting of the disc means 38 in assembling the mounting, and for other purposes as will be hereinafter described, the disc means 38 is provided with a central opening 39 and a plurality of fastener openings 40 spaced radially outwardly from the central opening 39 and circumferentially thereabout. The fastener openings 36 in the outer and inner bearing flange members 31, 32 and the fastener receiving openings 40 in the disc means 38 are so positioned as to be aligned in the assembled mounting. While the disc means 38 is shown as a substantially planar disc member, it is to be understood that the disc means may take other configurations such as a cupped configuration where such is desirable for the particular soil tilling operation to be undertaken. The outer circumferential periphery of the disc means 38 (not shown) may be tapered in any suitable manner to a sharpened peripheral edge, as is conventional, and the particular taper chosen may be suitable for the soil tilling operation to be undertaken by the disc means 38.

In order to retain the disc means 38 in proper assembled relation to the other elements of the mounting of my invention, and for other reasons as will be brought out more fully hereinafter, fastener means are provided to penetrate the flange means and the disc means radially outwardly of the outer race and to extend generally parallel to the axis, to secure the flange means and disc means together. Preferably, the fastener means takes the form of a plurality of suitable bolts 41, which are inserted through the aligned fastener receiving openings 36, 40 of the flange means and the disc means, and have nuts 42 threaded onto the exposed threaded ends of the bolts 41.

In assembling the mounting 12 of my invention, as described above, it is apparent that the bolt 14 is inserted through the bearing means 20, the inner flange member 32, the spacing washer 28 if considered necessary in order to space the disc means 38 axially outwardly from the support to which the bolt 14 is secured, a support such as a standard 15, and the means for securing the bolt 14 in place. Thereafter, the disc means 38 may be positioned to encircle the outer race 22 of the bearing means 20 and overlie the inner flange member 32, with the fastener receiving openings therein aligned. The outer flange member 31 is then positioned on the disc means 38, with the fastener openings therein aligned with the fastener opening in the disc means and inner flange member, and the fastener means such as bolts 41 inserted and tightened. At the time the outer flange member 31 is thus assembled, the volume within the cupper portion of the flange member, which extends over the headed end 26 of the bolt 14, is filled with a suitable substance such as grease which will entrap and retain dust particles or other contaminants which otherwise would enter into the area between the races of the bearing means 20 and substantially shorten the operating life of the bearing. Thus the outer flange member 31 additionally serves a shielding or protective function for the bearing means 20. As the fastener means such as bolts 41 are tightened, the slight conical form of the radially outwardly extending portions 34, 35, respectively, of the outer and inner flange members 31, 32 provides a tension preload for the bolts 41, thus assuring that the bolts do not readily loosen and result in spontaneous disassembly of the mounting.

In order to safely accommodate abnormal impact loads imposed radially on the disc means 38 during tilling operations, such as result from the disc means striking a rock, stone, or stump, and to protect the mounting 12 from damage, my invention contemplates a particular relationship between the constituent elements of the mounting assembly. Were the fastening means such as bolts 41 placed in shear stress upon the imposition of an impact load, those fastener means would be sheared and spontaneous disassembly of the disc means mounting would result. This difficulty, which has been a deficiency in prior art mountings for agricultural soil tilling implements, is avoided by the particular relationships contemplated by my invention. More particularly, the relative dimensions of the exterior of the outer race 22 of the bearing means 20 and of the central opening 39 of the disc means 38 are such that the outer race 22 is spaced from the disc means 38 a predetermined distance hereinafter referred to as a first radial clearance distance. The relative dimensions of the fastener means, such as bolts 41, and the fastener receiving openings 36 in the outer and inner flange members 31, 32 is such that the clearance between the same is only sufficient to permit insertion of the fastener means through the fastener receiving openings. The relative dimensions of the fastener means and the fastener receiving openings 40 in the disc means 38 are, however, such that the fastener means is normally spaced a predetermined distance from the disc means 38 hereinafter referred to as a second radial clearance distance. The second radial clearance distance is greater than the first radial clearance distance so that, upon imposition of an impact load on the disc means 38, the disc means radially contacts the outer race 22 of the bearing means 20 before contact is established with the fastener means. As a result, radially imposed impact loads are transmitted by the disc means 38 directly to the outer race 22 of the bearing means 20, without placing the fastener means in shear stress, to thereby avoid the danger of shearing the fastener means and the resultant spontaneous disassembly of the mounting.

Inasmuch as impact radial loads are transmitted from the disc means 38 directly to the outer race 22 of the bearing means 20, my invention further contemplates a particular relationship between the disc means 38 and the bearing means 20 in order to assure that impact radial loads are properly accommodated by the bearing means 20. More particularly, as described above, the outer and inner races 22, 21 of the bearing means 20 are provided with trackways within which the balls 23 are positioned. The trackway location of the outer race 22 is the least radial thickness of that race, and therefore is more susceptible to fracture upon the imposition of a radial impact load. Accordingly, the depth of cupping provided in the outer end inner flange members 31, 32, respectively, is such as to position the disc means 38 to encircle the outer race 22 of the bearing means 20 at a location spaced axially therealong from the row of balls 23, so that loads transmitted directly to the outer race by the disc means are applied to a location other than the location of the trackways.

Due to the axial tension force exerted by the fastener means such as the bolts 41 and nuts 42 between the bearing flange members 31, 32 and to the disc means 38, the lower radial forces which normally result from movement of the disc means 38 through the soil being tilled may satisfactorily be transmitted to the outer race 22 of the bearing means 20 through the area of frictional contact of the disc means and the bearing flange members and through the latter members. Thus, normal operation of the soil tilling mounting of my invention does not require that the disc means 38 be in radial contact with the outer race 22 of the bearing means 20, and this is believed to occur primarily only upon the occurrence of an abnormal impact radial load as described above.

It is considered apparent that a soil tilling implement mounting has been illustrated and described in detail which provides for properly accommodating abnormal impact radial loads such as occur when an agricultural soil tilling disc means strikes an object in the soil being tilled such as a stone, rock, or tree stump. Such abnormal impact radial loads are transmitted directly by the disc means to the outer race of a bearing means supporting the disc means for rotation, in such a manner that fastener means securing the mounting assembly together are not placed under shear stress and spontaneous disassembly of the mounting is avoided. This beneficial result is obtained by providing a particular relationship of radial clearance distances between the outer race of the bearing means, the disc means, and the fastener means extending through the disc means to secure the mounting together.

In the drawing and specification, there has been set forth a preferred embodiment of the invention, and although specific terms are employed, they are used in a generic and descriptive sense only and not for purposes of limitation, the scope of the invention being defined in the claims.

I claim:
1. An agricultural soil tilling implement mounting comprising:
   a shaft defining an axis of rotation,
   bearing means having an inner race mounted on said shaft and an outer race freely rotatable about said axis,
   bearing flange means engaging said outer race and extending radially therebeyond,
   said tilling disc means supported by said outer race and said flange means for rotation therewith about said axis during tilling operations, and
   fastener means penetrating said flange means and said disc means radially outwardly of said outer race and extending generally parallel to said axis, said fastener means securing said flange means and disc means together,
   said outer race normally being spaced radially from said disc means a first radial clearance distance and said fastener means being spaced radially from said disc means a second radial clearance distance always greater than said first distance so that said fastener means is protected against shear stress due to loads imposed radially on said disc means and so that abnormal impact loads imposed radially on said disc means during tilling operations are transmitted directly to said outer race by radial contact of said disc means therewith.

2. A mounting as claimed in claim 1 wherein said disc means includes a central opening through which said shaft extends and in which opening said bearing means is positioned, and said disc means further includes a plurality of openings spaced radially outwardly from said central opening and circumferentially thereabout and which are penetrated by said fastener means.

3. A mounting as claimed in claim 2 wherein said flange means comprises a pair of flange members positioned on opposite sides of said disc means, each of said flange members including a plurality of fastener receiving openings concentric with said openings in said disc means and of smaller dimensions than the latter, said flange member openings also being penetrated by said fastener means, said fastener means drawing said flange members into frictional surface contact with said outer race and said disc means so that normal loads imposed radially on said disc means during tilling operations are transmitted to said outer race through said flange members.

4. A mounting as claimed in claim 2 wherein said bearing means further includes an annular row of balls interposed between said inner and outer races and wherein said disc means encircles said outer race at a location spaced axially therealong offset from said row of balls.

References Cited
UNITED STATES PATENTS

| | | | |
|---|---|---|---|
| 421,539 | 2/1890 | Applequist | 308—181 |
| 657,204 | 9/1900 | Poole | 172—604 |
| 2,712,966 | 7/1955 | Brady et al. | 308—181 |
| 3,369,849 | 2/1968 | Hatcher | 308—181 |

ABRAHAM G. STONE, *Primary Examiner.*

S. C. PELLEGRINO, *Assistant Examiner.*